Jan. 7, 1947.  W. McK. BAIRD  2,414,009
ANTIFREEZE GASKET FOR REFRIGERATED SYSTEMS
Original Filed April 27, 1944
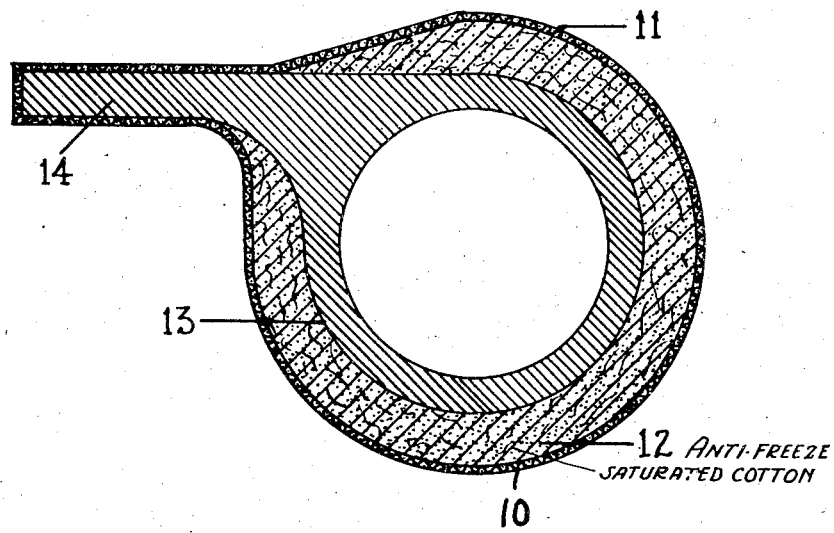
INVENTOR
William McKinley Baird.
BY Patented Jan. 7, 1947

2,414,009

UNITED STATES PATENT OFFICE 2,414,009

ANTIFREEZE GASKET FOR REFRIGERATED SYSTEMS

William McKinley Baird, Chicago, Ill.

Original application April 27, 1944, Serial No. 532,977. Divided and this application December 14, 1944, Serial No. 568,140

2 Claims. (Cl. 20—69)

This is a divisional application of application Serial No. 532,977, filed in the United States Patent Office on April 27, 1944, for Refrigerated system.

This invention relates to an anti-freeze gasket for refrigerators, refrigerated locker systems and the like.

In refrigerators, refrigerated locker systems and other constructions in which there is a temperature retained at or below freezing, where the doors, drawers, lockers, or other means for reaching the interior of the constructions are opened, the warmer air from the surrounding atmosphere causes condensation. Droplets of water are formed on the gaskets. The ordinary gaskets heretofore used tended either to hold the water in suspension or to absorb the water. When the gasket held the water in suspension and the door of the system was closed, this water froze so that the door or the like was stuck and had to be thawed to be opened. When the gasket absorbed the water, when the system was closed, the gasket froze to the system and the ice had to be broken away at considerable difficulty to permit opening of the door or the like.

It is among the objects of my invention to solve these problems and to provide a gasket that will ordinarily shed water to prevent freezing of the door or the like when closed. My gasket having a desired amount of anti-freeze solution is also adapted for water tolerance. My invention also contemplates such other objects, advantages and capabilities as will later more fully appear, and which are inherently possessed by my invention.

While I have shown in the accompanying drawing a preferred form of my invention, yet I wish it understood that the same is susceptible of modification and change without departing from the spirit of my invention.

Referring to the drawing, the figure is a cross-sectional view of my anti-freeze gasket.

The embodiment selected to illustrate my invention comprises a gasket 10 having an outer covering 11 of anti-freeze absorbent material, such as canvas, or the like, a filler 12 of anti-freeze absorbent material, such as cotton or the like, and a hollow core 13 of flexible material such as rubber or the like. The core is extended to form an attaching lip 14 which is covered by an extension of the covering 11.

The covering 11 and the filler 12 are saturated or suitably treated with glycerine or any other suitable non-freezing solution.

In use when my gasket is used around a door, or drawer head or other means for opening and closing a space leading into a refrigerated construction, and the door or the like is opened, my gasket being slick and smooth, does not tend to retain any droplets of water formed by condensation on its surfaces but sheds the droplets which drop off, and eliminate the freezing line. In the event that my gasket does not shed water due to heavy pressure of unusual moisture or other conditions, then the water is intermingled with the anti-freeze solution in the gasket and there is no freezing.

When the door is opened the resilient core of my gasket returns the gasket to its original shape.

While I have shown an illustrated shape of gasket, yet I do not want to limit my gasket to the particular shape shown, since it may be extended into many different variations in form and contour without departing from the spirit of my invention.

Having thus described my invention, I claim:

1. An anti-freeze gasket comprising a resilient core, a lip extending from said core, a filler substantially surrounding said core, and a cover around said filler, said cover and said filler saturated with non-freezing solution.

2. An anti-freeze gasket for refrigerated systems comprising a hollow rubber core, said core having integral therewith a straight attachment lip, a cotton filler substantially surrounding said core, and a canvas covering contacting said filler and enclosing said filler and said core, said covering having an extension for covering said lip, said covering and its extension and said filler saturated with non-freezing solution.

WILLIAM McKINLEY BAIRD.